(12) United States Patent
Yamauchi et al.

(10) Patent No.: US 11,002,355 B2
(45) Date of Patent: May 11, 2021

(54) ACTUATOR WITH SENSOR ON OUTPUT FLANGE

(71) Applicant: Nidec Corporation, Kyoto (JP)

(72) Inventors: Wataru Yamauchi, Kyoto (JP); Shozo Osugi, Kyoto (JP); Akihiro Toda, Kyoto (JP); Teiichi Hirono, Kyoto (JP)

(73) Assignee: Nidec Corporation, Kyoto (JP)

( * ) Notice: Subject to any disclaimer, the term of this patent is extended or adjusted under 35 U.S.C. 154(b) by 234 days.

(21) Appl. No.: 16/303,683

(22) PCT Filed: Feb. 10, 2017

(86) PCT No.: PCT/JP2017/004959
§ 371 (c)(1),
(2) Date: Nov. 21, 2018

(87) PCT Pub. No.: WO2017/203753
PCT Pub. Date: Nov. 30, 2017

(65) Prior Publication Data
US 2020/0321833 A1    Oct. 8, 2020

Related U.S. Application Data

(60) Provisional application No. 62/342,326, filed on May 27, 2016.

(51) Int. Cl.
*H02K 11/21* (2016.01)
*F16H 57/04* (2010.01)
(Continued)

(52) U.S. Cl.
CPC .......... *F16H 57/0427* (2013.01); *B25J 9/126* (2013.01); *F16H 1/32* (2013.01);
(Continued)

(58) Field of Classification Search
CPC .... H02K 11/21; H02K 11/215; H02K 11/225; H02K 2211/03; H02K 7/083;
(Continued)

(56) References Cited

U.S. PATENT DOCUMENTS 8,283,915 B2    10/2012   Tsuchida et al.
2008/0218160 A1*  9/2008  Tsuchida .............. H02K 11/215
                                                    324/207.25
(Continued)

FOREIGN PATENT DOCUMENTS

CN    102594010 A    7/2012
JP    60-166259 U    11/1985
(Continued)

OTHER PUBLICATIONS

Official Communication issued in International Patent Application No. PCT/JP2017/004959, dated May 16, 2017.

*Primary Examiner* — Michael Andrews
(74) *Attorney, Agent, or Firm* — Keating & Bennett (57) ABSTRACT

An actuator includes a motor including a first rotor rotatable in a circumferential direction about a center axis extending in a vertical direction, a second rotor including a sensor magnet and rotatable in the circumferential direction about the center axis, and a speed reducer that reduces rotation of the first rotor and transmits a torque to the second rotor. The motor includes a stationary portion including a stator facing the first rotor and a first bearing rotatably supporting the first rotor with respect to the stationary portion. The stationary portion includes a sensor which faces a portion of a trajectory of the sensor magnet rotating in the circumferential direction and detects a rotation position of the sensor magnet.

17 Claims, 10 Drawing Sheets

(51) Int. Cl.
  *F16H 57/029* (2012.01)
  *H02K 7/116* (2006.01)
  *F16H 1/32* (2006.01)
  *F16H 57/08* (2006.01)
  *H02K 7/14* (2006.01)
  *B25J 9/12* (2006.01)
  *F16H 49/00* (2006.01)
  *H02K 7/08* (2006.01)

(52) U.S. Cl.
  CPC ......... *F16H 49/001* (2013.01); *F16H 57/029* (2013.01); *F16H 57/0409* (2013.01); *F16H 57/08* (2013.01); *H02K 7/083* (2013.01); *H02K 7/116* (2013.01); *H02K 7/14* (2013.01); *H02K 11/21* (2016.01); *H02K 2211/03* (2013.01)

(58) Field of Classification Search
  CPC ...... H02K 7/116; H02K 5/161; H02K 5/1672; H02K 5/1732; F16H 1/32; F16H 49/001; B25J 9/126

USPC ...................................................... 310/68 B
  See application file for complete search history.

(56) References Cited

U.S. PATENT DOCUMENTS

| | | | | |
|---|---|---|---|---|
| 2012/0176007 | A1* | 7/2012 | Takeuchi | H02K 7/116 310/68 B |
| 2013/0026888 | A1* | 1/2013 | Migita | H02K 11/215 310/68 B |
| 2017/0237315 | A1* | 8/2017 | Hirokawa | H02K 41/06 310/77 |

FOREIGN PATENT DOCUMENTS

| | | |
|---|---|---|
| JP | 05-027417 U | 4/1993 |
| JP | 2002-078289 A | 3/2002 |
| JP | 2006-149139 A | 6/2006 |
| JP | 2008-253121 A | 10/2008 |

* cited by examiner

ACTUATOR WITH SENSOR ON OUTPUT FLANGE

BACKGROUND OF THE INVENTION

1. Field of the Invention

The present disclosure relates to an actuator.

2. Description of the Related Art

In general, an articulated industrial robot is known. In such an industrial robot, an actuator is provided at a joint between a first arm and a second arm, in order to relatively rotatably connect the first arm and the second arm.

For example, Japanese Unexamined Patent Application Publication No. 2006-149139 discloses a hollow actuator for driving joints of an industrial robot.

In this hollow actuator, a speed reducer and an output flange are provided on a load side of a motor. Driving force of a rotor provided on the motor is transmitted to the output flange via the speed reducer. The output flange is rotatably supported by the rotor via the speed reducer and a high-speed side bearing, and is further rotatably supported by a frame of the motor via a low-speed side bearing. Moreover, a rotational position of the rotor is detected by a position detector disposed on an anti-load side of the motor. The position detector includes an angle detection magnet fixed to the rotor, and a magnetic sensor fixed to a hallow shaft.

However, in Japanese Unexamined Patent Application Publication No. 2006-149139, the position detector does not detect a rotational position of the output flange on the load side, which outputs the rotational driving force of the motor as the driving force of the actuator. Consequently, the rotational position of the output flange cannot be detected with sufficient accuracy.

SUMMARY OF THE INVENTION

An actuator according to an exemplified embodiment of the present disclosure includes a motor including a first rotor rotatable in a circumferential direction about a center axis extending in a vertical direction; a second rotor including a sensor magnet and rotatable in the circumferential direction about the center axis; and a speed reducer that reduces rotation of the first rotor and transmits a torque to the second rotor, in which the motor includes a stationary portion including a stator facing the first rotor and a first bearing rotatably supporting the first rotor with respect to the stationary portion, and the stationary portion includes a sensor which faces a portion of a trajectory of the sensor magnet rotating in the circumferential direction and detects a rotation position of the sensor magnet.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Exemplified embodiments of the present disclosure will be described below with reference to the drawings.

In this specification, a direction parallel to a center axis CA in an actuator 100 of an articulated robot R is referred to as the "axial direction". Furthermore, in the axial direction, a direction from a cover 23 of a motor 110 toward a drive output portion 141 of a second rotor 140 is referred to as "upward", while a direction from the drive output portion 141 of the second rotor 140 toward the cover 23 of the motor 110 is referred to as "downward". Moreover, among surfaces of each component, a surface facing upward in the axial direction is referred to as "upper surface", and a surface facing downward in the axial direction is referred to as "lower surface".

A direction perpendicular to the center axis CA is referred to as "radial direction" and a circumferential direction about the center axis CA is referred to as "circumferential direction". In the radial direction, a direction toward the center axis CA is referred to as "inward", while a direction away from the center axis CA is referred to as "outward". Moreover, among lateral surfaces of each component, a side surface facing inward in the radial direction is referred to as "inner surface", and a side surface facing outward in the radial direction is referred to as "outer surface".

It should be noted that the directions and surfaces stated above do not indicate the positional relationships, directions, etc., when incorporated in the actual device.

Figure 1:
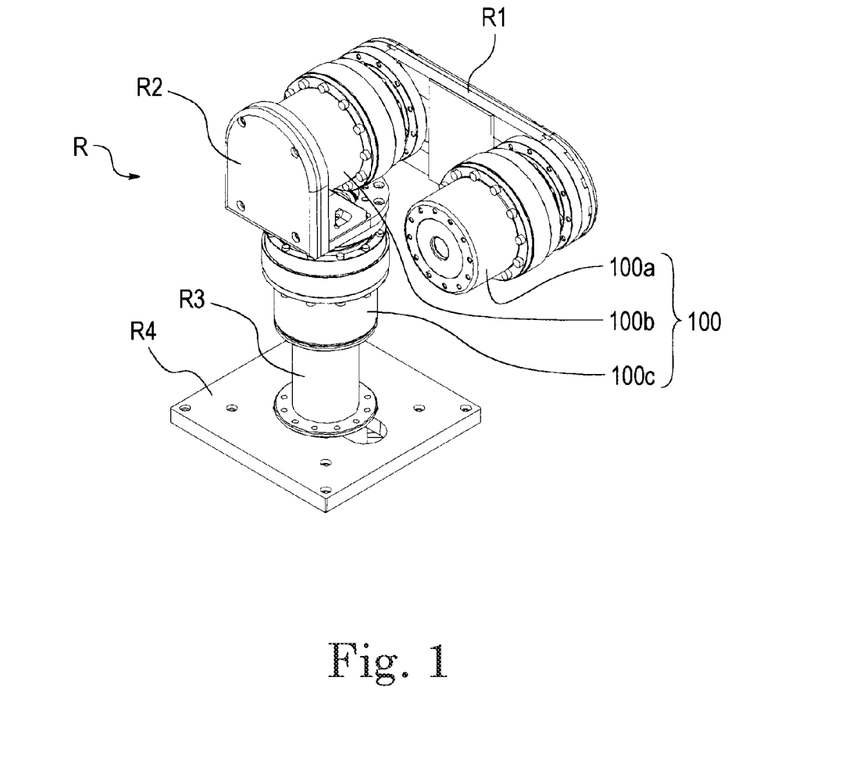
FIG. 1 is a perspective view illustrating an exemplified configuration of an articulated robot.

FIG. 1 is a perspective view illustrating an exemplified configuration of the articulated robot R. The articulated robot R is, for example, an industrial robot used in a manufacturing system for semiconductor devices. The articulated robot R includes a first arm R1, a second arm R2, a joint shaft R3, a base R4, and actuators 100a to 100c, as shown in FIG. 1. Additionally, the articulated robot R is provided with working units such as a gripping device or an imaging device for assembly, transportation, etc., however, those are not shown in FIG. 1.

The actuator 100a is provided at one end of the first arm R1. A working unit (not shown) is also attached to the actuator 100a. That is, the actuator 100a is provided at a first joint portion between the working unit and the one end of the first arm R1. The actuator 100b is provided at a second joint portion between the other end of the first arm R1 and one end of the second arm R2. The actuator 100c is provided at a third joint portion between the other end of the second arm R2 and one end of the joint shaft R3. In the second arm R2, one end fixed to the actuator 100b is bent perpendicular to the other end fixed to the actuator 100c. The other end of the joint shaft R3 is fixed to the base R4 for installing the articulated robot R.

The first arm R1, the second arm R2 and the working unit rotate relative to the joint shaft R3 and the base R4 by driving respective actuators 100a, 100b and 100c. That is, the working unit rotates about a rotation axis of the actuator 100a with respect to the first arm R1 by driving the actuator 100a at the first joint portion. The first arm R1, the actuator 100a and the working unit rotate about a rotation axis of the actuator 100b with respect to the second arm R2 by driving the actuator 100b at the second joint portion. Furthermore, the first arm R1, the second arm R2, the actuators 100a and 100b, and the working unit rotate about a rotation axis of the actuator 100c with respect to the joint shaft R3 by driving the actuator 100c at the third joint portion.

The actuators 100a, 100b and 100c of the respective joint portions will be collectively referred to as the actuator 100 hereinbelow. In this case, the center axis CA (refer to FIG. 2 described later) of the actuator 100 corresponds to the rotational axes of the actuators 100a, 100b and 100c. Moreover, in this embodiment, the actuator 100 is provided at the first to third joint portions of the articulated robot R, however, the application of the actuator 100 is not limited to this example.

Figure 2:
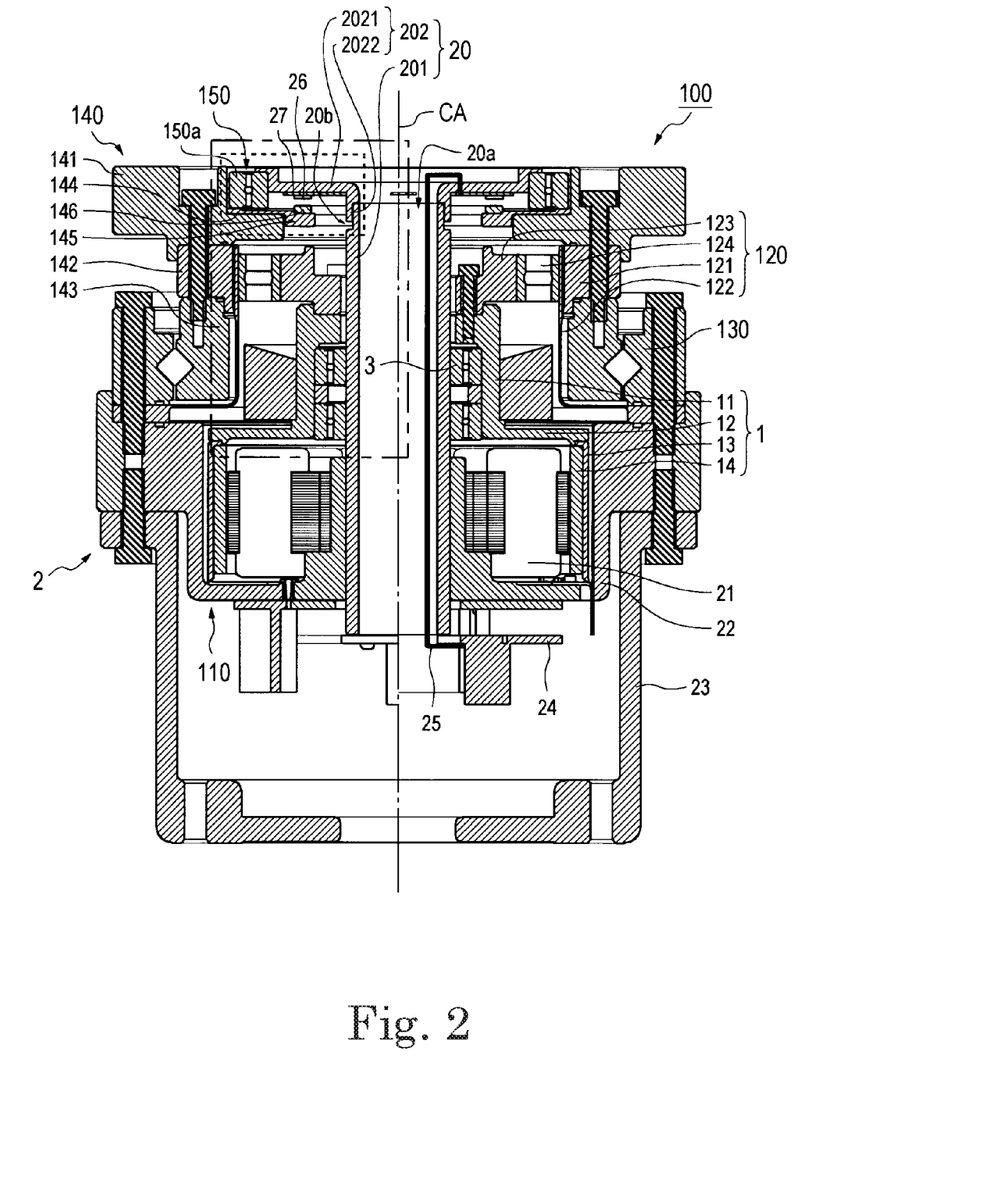
FIG. 2 is a cross-sectional view illustrating an exemplified configuration of an actuator.

FIG. 2 is a cross-sectional view illustrating an exemplified configuration of the actuator 100. In FIG. 2, the actuator 100 is cut with a cutting plane including the center axis CA. The actuator 100 is provided with a motor 110, a speed reducer 120, a cross-roller bearing 130, a second rotor 140, and a second bearing 150, as shown in FIG. 2.

First, a configuration of the motor 110 will be described. The motor 110 includes a first rotor 1, a stationary portion 2, and a first bearing 3. The motor 110 is an outer rotor type, and is a driving source of the actuator 100.

The first rotor 1 is rotatable in the circumferential direction about the center axis CA extending in the vertical direction. The first rotor 1 includes a tubular first tube portion 11, a circular plate portion 12 having an annular shape, a tubular magnet holding member 13, and a rotor magnet 14. The first tube portion 11 extends in the axial direction to face a post portion 201 of a shaft 20 (described later) in the radial direction. The circular plate portion 12 extends outward in the radial direction from a lower end of the first tube portion 11 in the axial direction. The magnet holding member 13 extends downward in the axial direction from an outer peripheral portion of the circular plate portion 12 in the radial direction and faces a stator 21 (described later) in the radial direction, thereby holding the rotor magnet 14. The rotor magnet 14 is held on an inner surface of the magnet holding member 13 and is rotatable together with the first rotor in the circumferential direction. The rotor magnet 14 is disposed facing an outer surface of the stator 21 in the radial direction. In particular, a plurality of different magnetic poles are alternately arranged on the inner surface of the magnet holding member 13 in the circumferential direction.

The stationary portion 2 rotatably supports the second rotor 140 via the cross-roller bearing 130 and the second bearing 150. The stationary portion 2 includes a shaft 20, a stator 21, a bracket 22, a cover 23, a substrate 24, a cable 25, a sensor 26, and flexible printed circuits (FPC) 27.

The shaft 20 is a fixed shaft. The shaft 20 includes a through-hole 20a penetrating in the axial direction. In particular, the through-hole 20a is a space that penetrates the post portion 201, as well as a disk portion 2021 and a tube portion 2022 of a lid portion 202, as described below.

Furthermore, the shaft 20 includes the post portion 201 extending along the center axis CA and the lid portion 202 provided at one end (upper end) of the post portion 201 in the axial direction. The post portion 201 is a cylindrical hollow member penetrated by the through-hole 20a. Moreover, the post portion 201 and the lid portion 202 may be different members provided separately from each other as shown in FIG. 2, but may be coupled to each other to form a single member.

The lid portion 202 includes the disk portion 2021 and the tube portion 2022. The disk portion 2021 extends radially outward from the post portion 201 when viewed from the axial direction. The tube portion 2022 extends downward in the axial direction from an inner peripheral portion of the disk portion 2021 in the radial direction. The tube portion 2022 extends from the disk portion 2021 toward the post portion 201 in the axial direction, and is coupled to one end of the post portion 201 in the axial direction. The inner diameter of a lower portion of the tube portion 2022 in the axial direction is slightly larger than the outer diameter of an upper portion of the post portion 201 in the axial direction. Therefore, the tube portion 2022 is coupled to the upper portion of the post portion 201 in the axial direction by fitting the upper portion of the post portion 201 in the axial direction into the lower portion of the tube portion 2022 in the axial direction.

The tube portion 2022 is coupled to the upper portion of the post portion 201 in the axial direction, so that a groove portion 20b is formed between the post portion 201 and the lid portion 202 in the axial direction. The groove portion 20b is recessed in the radial direction and extends in the circumferential direction. Accordingly, when the lid portion 202 is attached to the post portion 201, deviation in the attachment position due to the tolerance between these components can be offset by the groove portion 20b.

Moreover, the groove portion 20b is formed between the post portion 201 and the tube portion 2022 on an outer surface of the shaft 20, opens facing radially outward and is recessed inward in the radial direction in this embodiment, as shown in FIG. 2. However, the groove portion 20b is not limited to the example of FIG. 2. The groove portion 20b may be formed between the post portion 201 and the tube portion 2022 on an inner surface of the shaft 20. Furthermore, the groove portion 20b may open facing radially inward and may be recessed outward in the radial direction. For example, the inner diameter of a lower portion of the tube portion 2022 in the axial direction is slightly smaller than the outer diameter of an upper portion of the post portion 201 in the axial direction. In this case, the tube portion 2022 is coupled to the upper portion of the post portion 201 in the axial direction by fitting the lower portion of the tube portion 2022 in the axial direction into the upper portion of the post portion 201 in the axial direction, and thus the groove portion 20b is formed on the inner surface of the shaft 20.

The stator 21 faces the first rotor 1 in the radial direction to drive the first rotor 1. The bracket 22 is a member accommodating the stator 21 therein and holding the stator 21. The cover 23 accommodates the stator 21 and a lower portion of the substrate 24 in the axial direction, and is attached to the bracket 22. Furthermore, the covers 23 are, for example, fixed to the first arm R1, the second arm R2 and the joint shaft R3, at the first to third joint portions of the articulated robot R (see FIG. 1), respectively. In particular, the cover 23 of the actuator 100a is fixed to one end of the first arm R1. The cover 23 of the actuator 100b is fixed to one end of the second arm R2. The cover 23 of the actuator 100c is fixed to one end of the joint shaft R3.

The substrate 24 is attached to a lower surface of the bracket 22 at a lower end of the motor 110 in the axial direction. In particular, the substrate 24 is provided on a side of the post portion 201 opposite to the sensor 26 in the axial direction. The substrate 24 is electrically connected to the stator 21, and further electrically connected to the sensor 26 via a cable 25 and an FPC 27. The substrate 24 carries a control circuit (not shown), a communication circuit (not shown), and the like. The control circuit has functions of performing drive control of the motor 110, and controlling a rotational position of the second rotor 140. The communication circuit contains an input/output terminal complying with, for example, the Ethernet standard, and has a function of communicating with a device outside the actuator 100. Therefore, it is possible to control the actuator 100 using an external device connected to the communication circuit.

The cable 25 is wiring passing inside the through-hole 20a, and electrically connects the sensor 26 and the substrate 24. Consequently, the sensor 26 for detecting a rotational position of a sensor magnet 146 (described later) is connected to the substrate 24 via the cable 25 communicating inside of the through-hole 20a in the axial direction, which penetrates the shaft 20 and the post portion 201 in the axial direction. Accordingly, the cable 25, which electrically connects the sensor 26 and the substrate 24, does not have to pass through, for example, outside of the stationary portion 2, radially outward of the shaft 20 in the radial direction. Therefore, the actuator 100 can be downsized in the radial direction.

Figure 3:
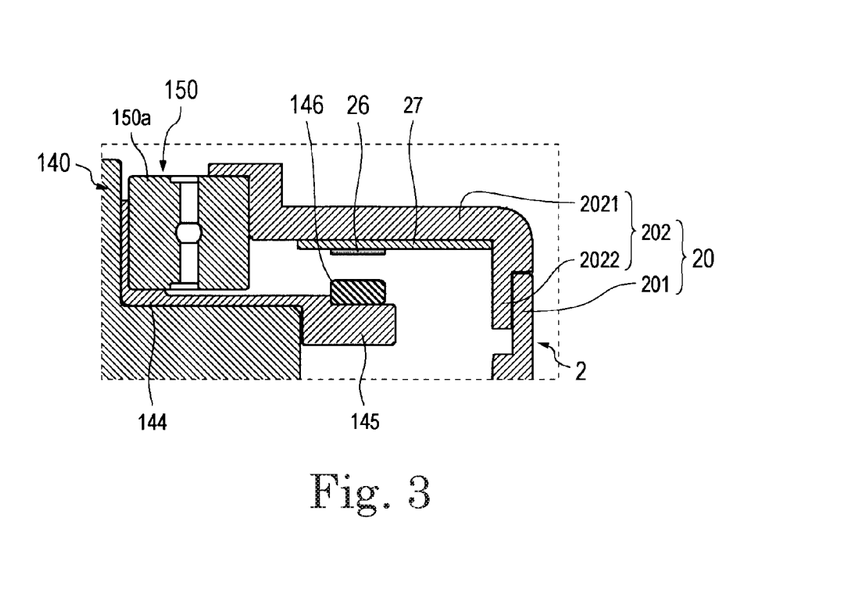
FIG. 3 is a cross-sectional view illustrating an exemplified arrangement of a sensor and a sensor magnet in the axial direction.

The sensor 26 is, for example, a Hall element, which is provided on the lid portion 202. In particular, the sensor 26 is provided on a lower surface of the disk portion 2021 via the FPC 27. The sensor 26 faces a portion of a trajectory of the sensor magnet 146 rotating in the circumferential direction to detect a rotational position of the sensor magnet 146. FIG. 3 is a cross-sectional view illustrating an exemplified arrangement of the sensor 26 and the sensor magnet 146 in the axial direction. FIG. 3 corresponds to a part surrounded by a broken line in FIG. 2. In particular, the sensor 26 is provided on the disk portion 2021 via the FPC 27 and faces in the axial direction a portion of the trajectory of the sensor magnet 146 rotating in the circumferential direction, as shown in FIG. 3.

The FPC 27 is a bendable printed circuit board on which the sensor 26 is mounted, and is affixed to the lower surface of the disk portion 2021.

The first bearing 3 is provided between the first rotor 1 and the shaft 20 of the stationary portion 2. In particular, the first bearing 3 is provided between the first tube portion 11 and the post portion 201. The first bearing 3 rotatably supports the first rotor 1 with respect to the stationary portion 2. For example, a ball bearing can be used as the first bearing 3. The first bearing 3 is fixed to the first rotor 1, and to the post portion 201 of the shaft 20 provided in the stationary portion 2, as shown in FIG. 2. In particular, an inner ring of the first bearing 3 is fixed to an outer surface of the post portion 201. Meanwhile, an outer ring of the first bearing 3 is fixed to an inner surface of the first tube portion 11 of the first rotor 1. Consequently, the post portion 201 of the shaft 20 functions as a fixed shaft of the motor 110.

The first bearing 3 is disposed above a magnetic circuit of the motor 110 in the axial direction, which includes the rotor magnet 14, the stator 21, etc., and does not overlap with the magnetic circuit in the radial direction. Therefore, it is possible to downsize the actuator 100 by increasing a size in the radial direction of the magnetic circuit of the motor 110, or decreasing a size in the radial direction of the actuator 100, as compared with a case where the first bearing 3 overlaps with the magnetic circuit in the radial direction.

A configuration of the speed reducer 120 will be described below. The speed reducer 120 reduces the rotation of the first rotor 1 and transmits the torque to the second rotor 140. In this embodiment, Flexwave (registered trademark, manufactured by Nidec-Shimpo Corporation), which is a wave gear device having a reduction ratio of 1/100, is adopted as the speed reducer 120, but the present disclosure is not limited to the example of the embodiment. Other reducer such as a planetary gear device may be used as the speed reducer 120 of the actuator 100.

The speed reducer 120 includes an internal gear 121, a hat gear 122, a cam 123, and an elastic bearing (third bearing) 124, as shown in FIG. 2.

The internal gear 121 is an internal gear having rigidity, in which teeth aligned in the circumferential direction are formed on an inner surface. The internal gear 121 is connected to an inner ring of the cross-roller bearing 130 and a drive output portion 141 (described later) of the second rotor 140, and is rotatable together with those components in the circumferential direction.

The hat gear 122 includes a cylindrical portion extending in the axial direction, and an annular portion covering an upper end of the cylindrical portion in the axial direction. The post portion 201 of the shaft 20 is inserted into an opening provided at the center of the annular portion. The cylindrical portion of the hat gear 122 is deformable in the radial direction. An outer surface of the cylindrical portion in the radial direction has teeth formed in the circumferential direction. The number of the teeth is smaller than the number of the teeth formed on an inner surface of the internal gear 121.

The cam 123 has an elliptical shape when viewed from the axial direction, and is fixed to the first rotor 1 so as to be rotatable together with the first rotor 1. The cam 123 is formed with an opening penetrating in the axial direction at its center. The cam 123 is rotatable about the center axis CA with respect to the post portion 201 by inserting the post portion 201 of the shaft 20 into the opening of the cam 123.

The elastic bearing 124 is a radially deformable bearing, and is provided on an outer surface of the cam 123 along an outer peripheral portion of the elliptical cam 123. The elastic bearing 124 is held by the first rotor 1 radially outward of the first bearing 3, and rotatably supports the second rotor 140. An inner ring of the elastic bearing 124 is fixed to the cam 123, is attached to the first rotor 1 via the cam 123, and is rotatable together with the first rotor 1 in the circumferential direction.

The elastic bearing 124 is accommodated inside the cylindrical portion of the hat gear 122, and deforms the cylindrical portion of the hat gear 122 in the radial direction in response to a shape of the cam 123. In particular, the elastic bearing 124 deflects the cylindrical portion of the hat gear 122 by pushing the cylindrical portion in the radial direction, so that the teeth formed on an outer surface of the deflected portion are partially engaged with the teeth formed on the inner surface of the internal gear 121. Furthermore, the elastic bearing 124 moves a position at which the hat gear 122 and the internal gear 121 are partially engaged in the circumferential direction by rotating the elastic bearing 124 together with the first rotor 1. At this time, the internal gear 121 having more teeth than the hat gear 122 rotates at a lower speed than that of the hat gear 122 in response to a difference between the number of teeth of hat gear 122 and the number of teeth of the internal gear 121. Accordingly, the speed reducer 120 rotates the second rotor 140 connected to the internal gear 121 at a lower speed than that of the first rotor 1 inputting the driving force of the elastic bearing 124 and the hat gear 122.

A configuration of the second rotor 140 will be described. The second rotor 140 is rotatable about the center axis CA in the circumferential direction. The second rotor 140 includes a drive output portion 141, a rotation transmission portion 142, a tubular second tube portion 143, a rotor support portion 144, a magnet support portion 145, and a sensor magnet 146.

The drive output portions 141 are connected to the working unit, the first arm R1 and the second arm R2, at the first to third joint portions of the articulated robot R (see FIG. 1), respectively. The drive output portions 141 output the driving force of the actuator 100 while connected to the working unit, the first arm R1 and the second arm R2. In particular, the drive output portion 141 of the actuator 100a is connected to the working unit and outputs the driving force to the working unit. The drive output portion 141 of the actuator 100b is connected to the first arm R1 and outputs the driving force to the first arm R1. The drive output portion 141 of the actuator 100c is connected to the second arm R2 and outputs the driving force to the second arm R2.

The rotation transmission portion 142 is connected to the drive output portion 141 and the second tube portion 143, and is rotatable together with the drive output portion 141 and the second tube portion 143 in the circumferential direction. The rotation transmission portion 142 transmits the driving force, input from the first rotor 1 and reduced in the rotation speed by the speed reducer 120, to the second rotor 140 (in particular, the drive output portion 141). The rotation transmission portion 142 is the same member as the internal gear 121 of the speed reducer 120 in this embodiment. That is, the internal gear 121 functions as the rotation transmission portion 142. However, the rotation transmission portion 142 is not limited to this example, and may be a different member from the internal gear 121. In a case where the rotation transmission portion 142 is a different member, the rotation transmission portion 142 is connected to the internal gear 121.

The second tube portion 143 extends in the axial direction, and is provided radially outward of the first tube portion 11. The second tube portion 143 is the same member as the inner ring of the cross-roller bearing 130 in this embodiment. That is, the inner ring of the cross-roller bearing 130 functions as the second tube portion 143. However, the second tube portion 143 is not limited to this example, and may be a different member from the inner ring of the cross-roller bearing 130. In a case where the second tube portion 143 is a different member, the second tube portion 143 is connected to the inner ring of the cross-roller bearing 130.

The rotor support portion 144 positions an attachment position of the second bearing 150 to the drive output portion 141. Moreover, the magnet support portion 145 supports the sensor magnet 146.

The rotor support portion 144 may be coupled to the sensor magnet support portion 145 as the same member, as shown in FIG. 3. In this case, the rotor support portion 144 positions the second bearing 150 and supports the sensor magnet 146, in the axial direction. Consequently, the attachment position of the second bearing 150 to the disk portion 2021 of the lid portion 202 and the drive output portion 141 is determined by the rotor support portion 144, and the sensor magnet 146 is supported by the rotor support portion 144. Therefore, the number of the components of the actuator 100 can be reduced.

Figure 4:
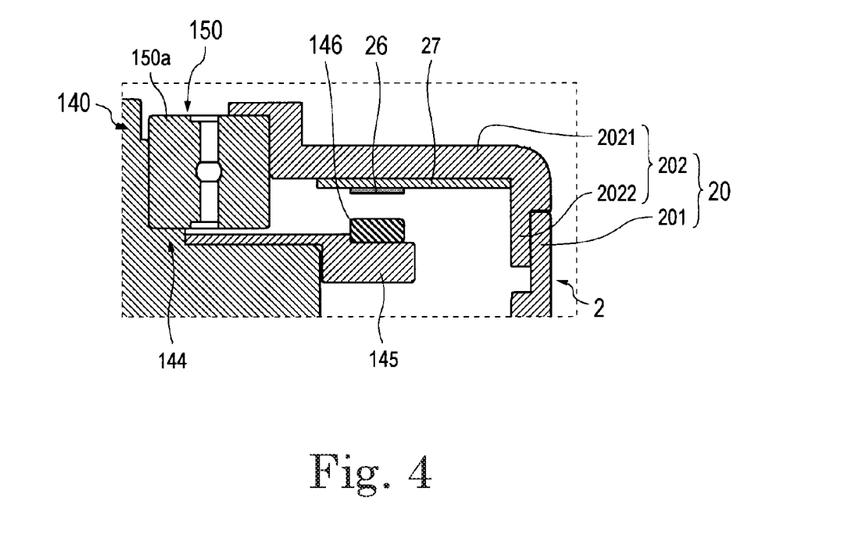
FIG. 4 is a cross-sectional view illustrating another exemplified configuration of a rotor support portion and a magnet support portion according to an exemplified embodiment of the present invention.

Alternatively, the sensor magnet support portion 145 may be different member from the rotor support portion 144. FIG. 4 is a cross-sectional view illustrating another exemplified configuration of the rotor support portion 144 and the magnet support portion 145 in the embodiment. FIG. 4 corresponds to a part surrounded by a broken line in FIG. 2. When the rotor support portion 144 is a different member from the sensor magnet support portion 145 as shown in FIG. 4, the magnet support portion 145 may be disposed at a position away from the rotor support portion 144.

Furthermore, when the rotor support portion 144 is a different member from the magnet support portion 145, at least one of the rotor support portion 144 and the magnet support portion 145 may be the same member as the drive output portion 141. For example, the rotor support portion 144 may protrude from an upper surface of the drive output portion 141 in the axial direction, like a step or a protrusion as shown in FIG. 4. In particular, the rotor support portion 144 may protrude in the axial direction from a bottom surface in the step along an inner peripheral portion of the drive output portion 141. Moreover, the magnet support portion 145 may protrude from an inner surface of the drive output portion 141, for example, in the radial direction. Consequently, the number of the components of the actuator 100 can be reduced.

The sensor magnet 146 is rotatable together with the second rotor 140 in the circumferential direction. In particular, the sensor magnet 146 is provided with different magnetic poles formed alternately in the circumferential direction, and is disposed facing the sensor 26 in the radial direction. However, the sensor magnet 146 is not limited to the example of this embodiment, and may be configured to have a plurality of magnet pieces having different magnetic poles alternately arranged in the circumferential direction.

As described above, the sensor magnet 146 of which the rotational position is detected by the sensor 26 is provided on the second rotor 140 which is driven to rotate at a lower speed than that of the first rotor 1 by the speed reducer 120. Accordingly, the sensor 26 is capable of detecting the rotational position of the second rotor 140 which is a member for outputting the driving force of the actuator 100. Therefore, a rotational position of a member outputting the driving force of the actuator 100 (i.e. the drive output portion 141 of the second rotor 140) can be detected with accuracy, as compared with a case where the sensor 26 detects, for example, a rotational position of the first rotor 1 inputting the driving force of the actuator 100 to the second rotor 140.

A configuration of the second bearing 150 will be described. The second bearing 150 is provided between the second rotor 140 and the disk portion 2021 of the shaft 20 provided in the stationary portion 2 of the motor 110, in at least one of the axial direction and the radial direction. In FIG. 2, the second bearing 150 is provided between the drive output portion 141 of the second rotor 140 and the disk portion 2021.

For example, in a case where the second bearing 150 is not provided between the second rotor 140 on which the sensor magnet 146 is provided and the lid portion 202 on which the sensor 26 is provided, when assembling parts of the motor 110 except for the lid portion 202, the speed reducer 120, the second rotor 140, and the lid portion 202 in this order, a relative attachment position of the lid portion 202 to the second rotor 140 may be deviated due to the accumulated tolerance of those components. Consequently, a relative attachment position of the sensor 26 is deviated from the sensor magnet 146. However, deviation of the relative attachment position caused by the tolerance of the component upon assembling as stated above can be reduced or offset by providing the second bearing 150 between the second rotor 140 and the lid portion 202. Therefore, the rotational position of the second rotor 140 can be detected with the improved detection accuracy.

The second bearing 150 is provided radially outward of the sensor 26 and the magnet 146 in this embodiment, as shown in FIG. 2. For example, in a case where the second bearing 150 is provided radially inward of the sensor 26, a portion of the disk portion 2021 on which the sensor 26 is provided is supported radially inward by the second bearing 150 in the radial direction, but not supported radially outward of the second bearing 150. Therefore, when the vibration due to the rotation of the second rotor 140 is transmitted to the disk portion 2021 via the second bearing 150, the sensor 26 vibrates together with a portion of the disk portion 2021, which is disposed radially outward of the second bearing 150, in the axial direction. Consequently, the detection accuracy of the sensor 26 may be deteriorated. However, when the second bearing 150 is provided radially outward of the sensor 26, the portion of the disk portion 2021 on which the sensor 26 is provided is supported at both ends in the radial direction. That is, such a part is supported radially inward by the post portion 201 in the radial direction, and is supported radially outward by the second bearing 150. Therefore, it is possible to prevent the detection accuracy from being deteriorated due to the vibration of the sensor 26 in the axial direction as stated above.

Figure 5:
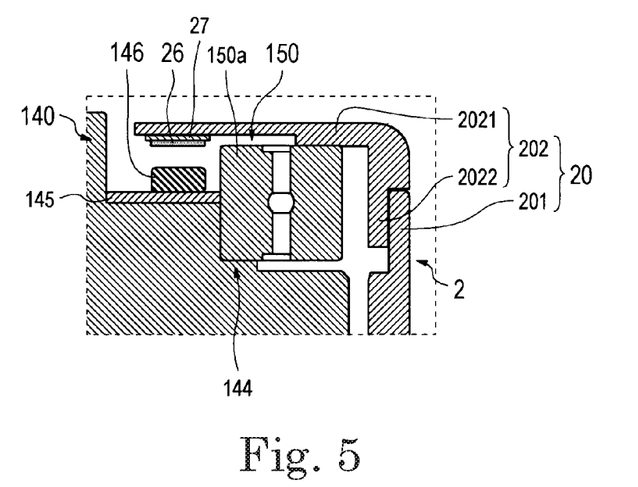
FIG. 5 is a cross-sectional view illustrating another exemplified attachment position of a second bearing to the sensor and the sensor magnet.

Moreover, the attachment position of the second bearing 150 to the sensor 26 and the sensor magnet 146 is not limited to the example of FIG. 2. FIG. 5 is a cross-sectional view illustrating another exemplified attachment position of the second bearing 150 to the sensor 26 and the sensor magnet 146. FIG. 5 corresponds to a part surrounded by a broken line in FIG. 2. The second bearing 150 may be provided radially inward of the sensor 26, as shown in FIG. 5. Consequently, the attachment position of the second bearing 150 can approach closer to the post portion 201 without moving the attachment position of the sensor 26 much away from the post portion 201. Therefore, a size in the radial direction of the disk portion 2021 on which the sensor 26 is provided can be shortened as compared with a case where the second bearing 150 is provided radially outward of the sensor 26. Accordingly, the rigidity of the disk portion 2021 can be enhanced.

The second bearing 150 is, for example, a ball bearing 150a. An inner ring of the ball bearing 150a is fixed to one of the second rotor 140 and the disk portion 2021. An outer ring of the ball bearing 150a is fixed to the other one of the second rotor 140 and the disk portion 2021. For example, the inner ring of the ball bearing 150a is fixed to the disk portion 2021 in FIG. 2. The outer ring of the ball bearing 150a is fixed to the second rotor 140, in particular, to the drive output portion 141 via the rotor support portion 144. For example, in a case where a sliding member is used as the second bearing 150, noise and fragment of the sliding member are generated in the actuator 100 due to the rotation of the second rotor 140 in a state where the sliding member is in contact with the second rotor 140, which deteriorate the reliability of the actuator 100. However, it is possible to prevent or suppress the occurrence of the noise while preventing the occurrence of the fragments, as stated above, by using the ball bearing 150a as the second bearing 150.

Figure 6:
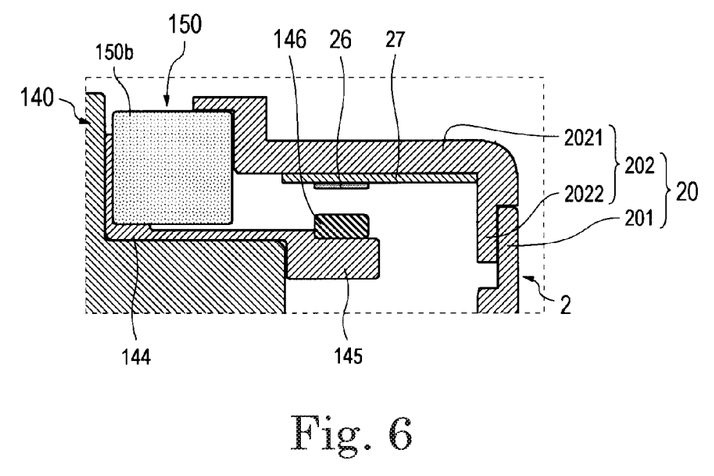
FIG. 6 is a cross-sectional view illustrating an exemplified configuration using a sliding member as the second bearing according to an exemplified embodiment of the present invention.

The present disclosure is not limited to the example of the embodiment. The second bearing 150 may be a sliding member 150b disposed between the second rotor 140 and the disk portion 2021 in one of the axial direction and the radiation direction. FIG. 6 is a cross-sectional view illustrating an exemplified configuration using the sliding member 150b as the second bearing 150 in the embodiment. FIG. 6 corresponds to a part surrounded by a broken line in FIG. 2. Consequently, the second bearing 150 can be formed using an inexpensive and lightweight material (for example, resin, rubber, etc.) as compared with a case where, for example, a metal bearing is used as the second bearing 150. Therefore, the manufacturing cost can be reduced and the actuator 100 can be light-weighted.

The attachment position of the second bearing 150 to the lid portion 202 and the second rotor 140 will be described with reference to first to third examples.

Figure 7:
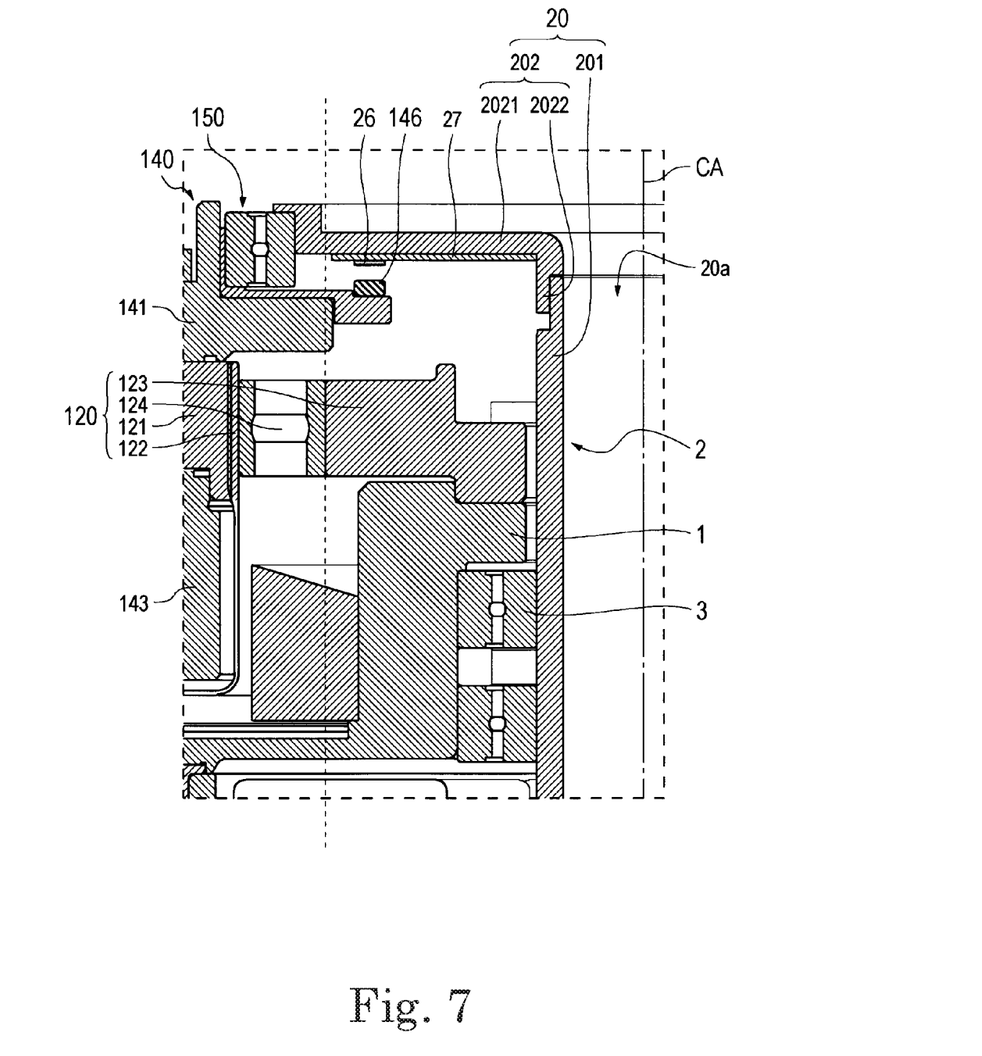
FIG. 7 is a cross-sectional view illustrating a first exemplified attachment position of the second bearing in the radial direction.

FIG. 7 is a cross-sectional view illustrating a first exemplified attachment position of the second bearing 150 in the radial direction. FIG. 7 corresponds to a part surrounded by a broken line in FIG. 2. In the first example, the second bearing 150 is disposed radially outward of the first bearing 3 and overlaps with at least a partial region of the elastic bearing 124 in the radial direction when viewed from the axial direction, as shown in FIG. 7.

Figure 8:
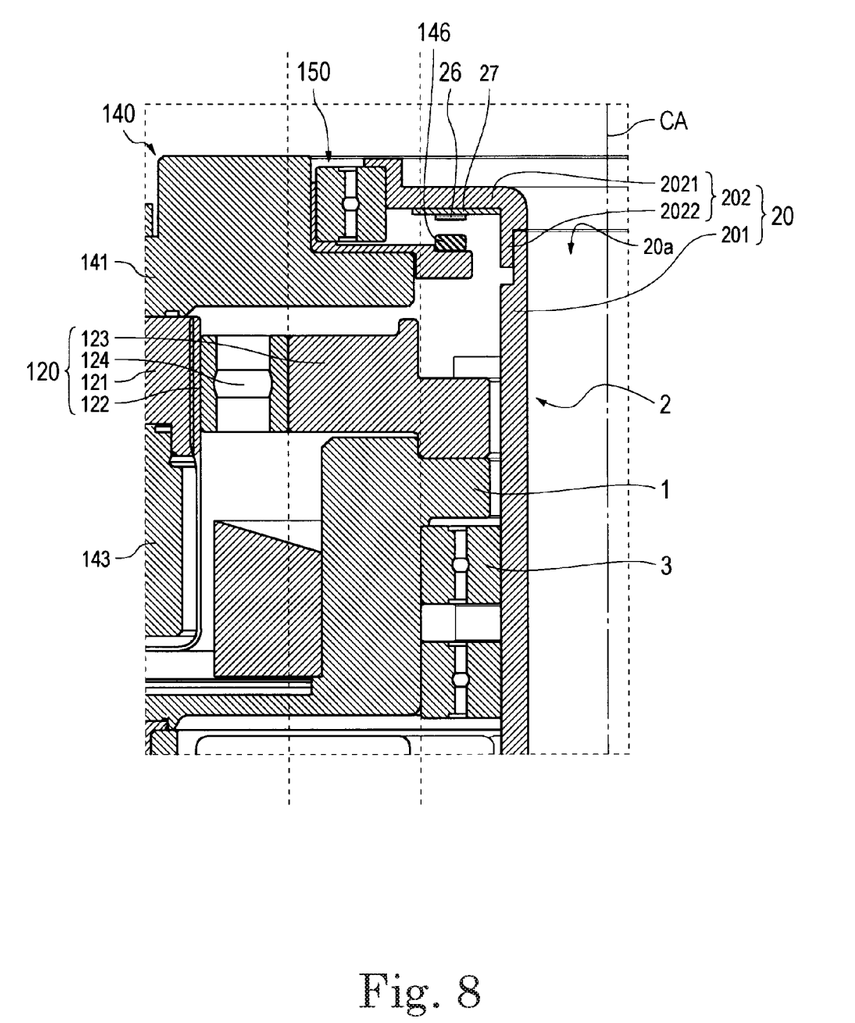
FIG. 8 is a cross-sectional view illustrating a second exemplified attachment position of the second bearing in the radial direction.
Figure 9:
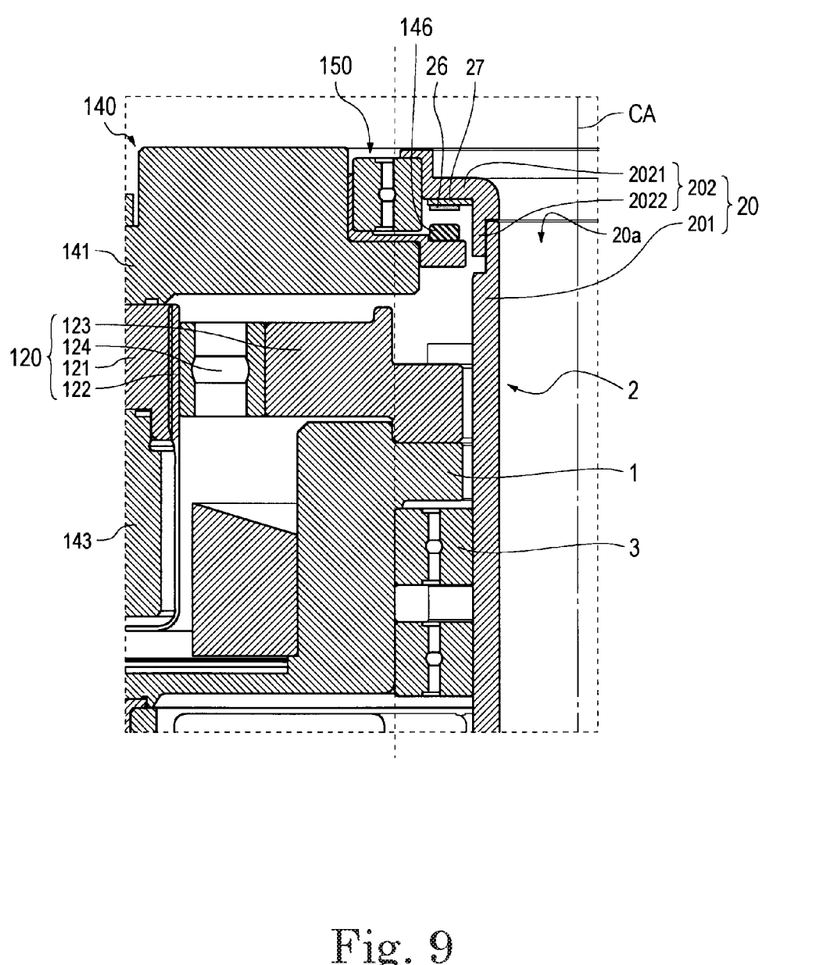
FIG. 9 is a cross-sectional view illustrating a third exemplified attachment position of the second bearing in the radial direction.

In FIG. 7, the second bearing 150 provided on at least one of the second rotor 140 and the disk portion 2021 overlaps with, when viewed from the axial direction, at least a partial region of the elastic bearing 124 disposed radially outward of the first bearing 3 in the radial direction. Furthermore, the second bearing 150 is disposed radially outward of the first bearing 3 provided on the post portion 201 of the shaft 20. Therefore, a space between the second bearing 150 and the post portion 201 can be wider as compared with a case where the second bearing 150 is disposed radially inward of the elastic bearing 124 (for example, as shown in FIGS. 8 and 9 described below). Accordingly, it is possible to further arrange, for example, a brake portion for reducing or stopping the rotation of the second rotor 140 in such a space.

FIG. 8 is a cross-sectional view illustrating a second exemplified attachment position of the second bearing 150 in the radial direction. FIG. 8 corresponds to a part surrounded by a broken line in FIG. 2. In second example, the second bearing 150 is disposed between the first bearing 3 and the elastic bearing 124 in the radial direction when viewed from the axial direction, as shown in FIG. 8. In particular, the second bearing 150 is disposed radially outward of the first bearing 3 and disposed radially inward of the elastic bearing 124 when viewed from the axial direction. In FIG. 8, the second bearing 150 provided on at least one of the second rotor 140 and the disk portion 2021 is disposed, in the radial direction, between the first bearing 3 provided on the post portion 201 of the shaft 20 and the elastic bearing 124 disposed radially outward of the first bearing 3. Therefore, a space between the second bearing 150 and the post portion 201 can be wider as compared with a case where the second bearing 150 overlaps with at least a partial region of the first bearing 3 (for example, as shown in FIG. 9 described below). Since the second bearing 150 approaches the post portion 201, it is possible to shorten a size in the radial direction of the disk portion 2021 as compared with a case where the second bearing 150 overlaps with at least a partial region of the elastic bearing 124 when viewed from the axial direction (for example, see FIG. 7), thereby improving the rigidity of the disk portion 2021.

FIG. 9 is a cross-sectional view illustrating a third exemplified attachment position of the second bearing 150 in the radial direction. FIG. 9 corresponds to a part surrounded by a broken line in FIG. 2. In third example, the second bearing 150 overlaps with at least a partial region of the first bearing in the radial direction and is disposed radially inward of the third bearing when viewed from the axial direction, as shown in FIG. 9. In FIG. 9, the second bearing 150 provided on at least one of the second rotor 140 and the disk portion 2021 overlaps with at least a partial region of the first bearing 3 provided on the post portion 201. Furthermore, the second bearing 150 is disposed radially inward of the elastic bearing 124 disposed radially outward of the first bearing 3, when viewed from the axial direction. Therefore, it is possible to shorten a size in the radial direction of the disk portion 2021 as compared with a case where the second bearing 150 is disposed radially outward of the first bearing 3 (for example, see FIGS. 7 and 8), thereby further improving the rigidity of the disk portion 2021.

The sensor 26 and the sensor magnet 146, of the actuator 100, are opposed to each other in the axial direction in the embodiment stated above, however, the present disclosure is not limited to this example. The sensor 26 and the sensor magnet 146 may be opposed to each other in the radial direction. A configuration different from the embodiment stated above will be described below. The same reference numerals are given to the same components as those in the embodiment stated above, and the description thereof may be omitted.

Figure 10A:
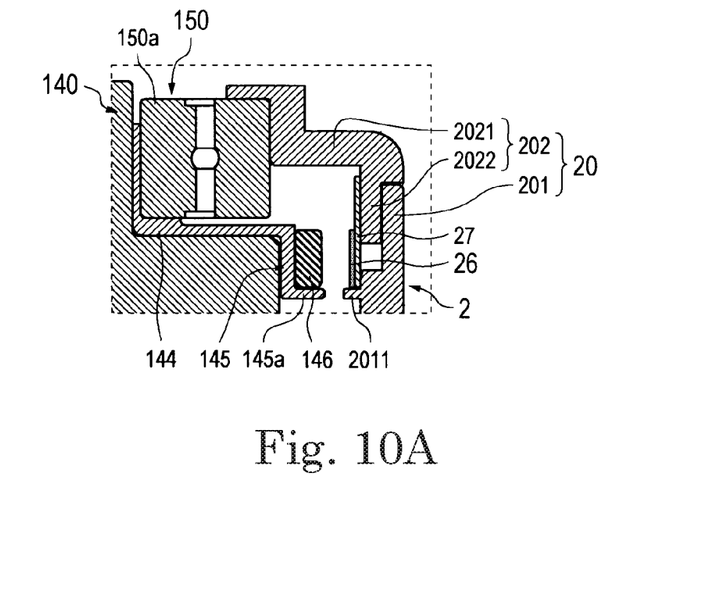
FIG. 10A is a cross-sectional view illustrating an exemplified arrangement of the sensor and the sensor magnet in the radial direction.
Figure 10B:
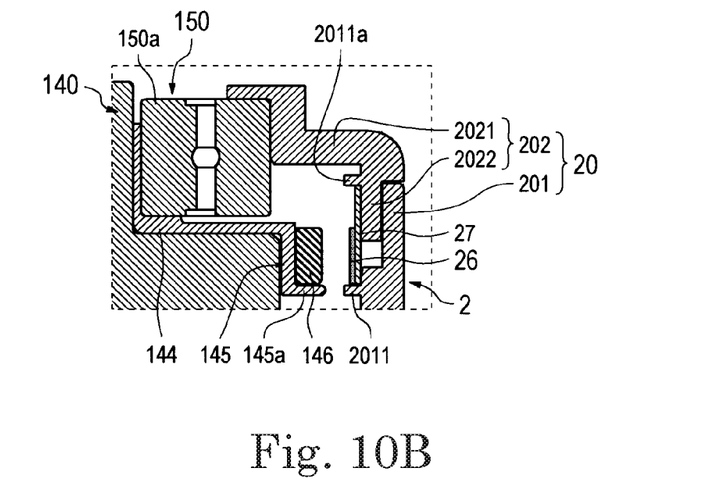
FIG. 10B is a cross-sectional view illustrating another exemplified arrangement of the sensor and the sensor magnet in the radial direction.

A first modification example of the embodiment stated above will be described. FIG. 10A is a cross-sectional view illustrating an exemplified arrangement of the sensor 26 and the sensor magnet 146 in the radial direction. FIG. 10B is a cross-sectional view illustrating another exemplified arrangement of the sensor 26 and the sensor magnet 146 in the radial direction. Each of FIG. 10A and FIG. 10B corresponds to a part surrounded by a broken line in FIG. 2. The sensor 26 faces in the radial direction a portion of the trajectory of the sensor magnet 146 rotating in the circumferential direction, as shown in FIG. 10A and FIG. 10B.

The sensor 26 is provided on an outer surface in the radial direction commonly shared by the tube portion 2022 in the lid portion 202 and the post portion 201 via the FPC 27. In particular, a portion of FPC 27 on which the sensor 26 is mounted is affixed to the tube portion 2022, and the other portion of the FPC 27 is affixed to the post portion 201. A portion of the sensor 26 overlaps with the tube portion 2022 and the other portion of the sensor overlaps with the post portion 201, when viewed from the radial direction. Moreover, the sensor 26 is not limited to the examples of FIG. 10A and FIG. 10B, and may be provided on an outer surface in the radial direction of one of the tube portion 2022 and the post portion 201.

That is, the sensor 26 may be provided on the outer surface in the radial direction of at least one of the tube portion 2022 and the post portion 201. Consequently, the sensor 26, the sensor magnet 146 and the second bearing 150 can approach closer to the post portion 201 of the shaft 20 in the radial direction as compared with a case where the sensor 26 is provided on the disk portion 2021 and faces in the radial direction a portion of the trajectory of the sensor magnet 146 rotating in the circumferential direction. Therefore, the actuator 100 can be downsized in the radial direction. Additionally, it is possible to shorten a size in the radial direction of the disk portion 2021, thereby improving the rigidity of the disk portion 2021.

In the first modification example, at least one of the post portion 201 and the lid portion 202 further includes a sensor positioning portion 2011 for determining the attachment position of the sensor 26 in the axial direction. In particular, when at least a portion of the sensor 26, or at least a portion of the FPC 27 on which the sensor 26 is provided is disposed on the outer surface of the post portion 201, the sensor positioning portion 2011 is provided on the outer surface of the post portion 201 as shown in FIG. 10A and FIG. 10B. Furthermore, a sensor positioning portion 2011a may also be on the outer surface of the tube portion 2022 in order to further facilitate to determine the attachment position of the sensor 26 in the axial direction, as shown in FIG. 10B. Alternatively, when the entire sensor 26 or the entire FPC 27 on which the sensor 26 is provided is provided on the outer surface of the tube portion 2022, the sensor positioning portion 2011 is provided on the outer surface of the tube portion 2022. Consequently, the sensor 26 is easily positioned in the axial direction, thus the sensor 26 can be attached more easily.

In the first modification example, the second rotor 140 includes a sensor magnet positioning portion 145a for determining the attachment position of the sensor magnet 146 in the axial direction. In particular, the magnet support portion 145 of the second rotor 140 includes the sensor magnet positioning portion 145a. Consequently, the sensor magnet 146 is easily positioned in the axial direction, thus the sensor magnet 146 can be attached more easily.

Figure 11:
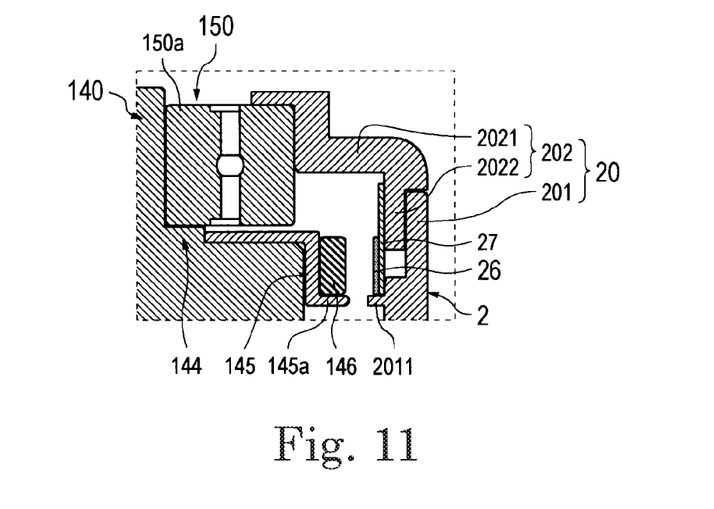
FIG. 11 is a cross-sectional view illustrating another exemplified configuration of the rotor support portion and the magnet support portion in a first modification example.

Furthermore, the rotor support portion 144 may be coupled to the sensor magnet support portion 145 as the same member, as shown in FIG. 10A and FIG. 10B. However, it is not limited to the examples of FIG. 10A and FIG. 10B. FIG. 11 is a cross-sectional view illustrating another exemplified configuration of the rotor support portion 144 and the magnet support portion 145 in the first modification example. FIG. 11 corresponds to a part surrounded by a broken line in FIG. 2. The rotor support portion 144 may be a different member from the magnet support portion 145 as shown in FIG. 11. Consequently, the magnet support portion 145 can be disposed at a position away from the rotor support portion 144.

Furthermore, at least one of the rotor support portion 144 and the magnet support portion 145 having the sensor magnet positioning portion 145a may be the same member as the drive output portion 141. For example, the rotor support portion 144 may protrude from the upper surface of the drive output portion 141 in the axial direction, like a step or a protrusion, as shown in FIG. 11. Moreover, the sensor magnet positioning portion 145a may protrude from the inner surface of the drive output portion 141, for example, in the radial direction. Consequently, the number of the components of the actuator 100 can be reduced.

Figure 12:
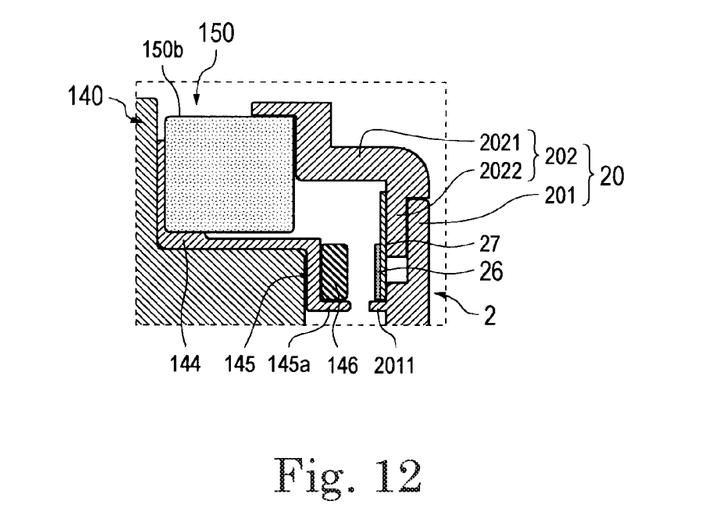
FIG. 12 is a cross-sectional view illustrating an exemplified configuration in which a sliding member is used as the second bearing in the first modification example.

The second bearing 150 may be the ball bearing 150a as shown in FIG. 10A and FIG. 10B, but is not limited to the examples of FIG. 10A and FIG. 10B. The second bearing 150 may be the sliding member 150b. FIG. 12 is a cross-sectional view illustrating an exemplified configuration in which the sliding member 150b is used as the second bearing 150 in the first modification example. FIG. 12 corresponds to a part surrounded by a broken line in FIG. 2. Consequently, the sliding member 150b can be formed using an inexpensive and lightweight material (for example, resin, rubber, etc.) as shown in FIG. 12. Therefore, the manufacturing cost can be reduced and the actuator 100 can be light-weighted.

Figure 13:
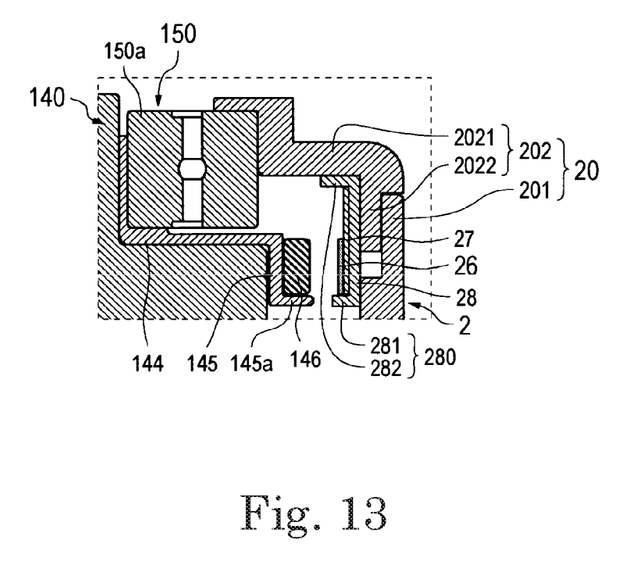
FIG. 13 is a cross-sectional view illustrating another exemplified arrangement of the sensor and the sensor magnet in the radial direction.

A second modification example of the embodiment stated above will be described. FIG. 13 is a cross-sectional view illustrating another exemplified arrangement of the sensor 26 and the sensor magnet 146 in the radial direction. FIG. 13 corresponds to a part surrounded by a broken line in FIG. 2.

In the second modification example, the stationary portion 2 further includes a sensor support portion 28 provided on at least one of the tube portion 2022 and the post portion 201, in addition to the configuration illustrated in the first modification example. In particular, a portion of the sensor support portion 28 is provided on the outer surface of the tube portion 2022, and the other portion of the sensor support portion 28 is provided on the outer surface of the post portion 201, as shown in FIG. 13. Alternatively, the entire sensor support portion 28 may be provided on the outer surface of the tube portion 2022, or on the outer surface of the post portion 201.

The sensor 26 is provided on an outer surface of the sensor support portion 28 in the radial direction via the FPC 27, and faces in the radial direction a portion of the trajectory of the sensor magnet 146 rotating in the circumferential direction. Alternatively, the sensor 26 may be provided directly on the outer surface of the sensor support portion 28. Even in this case, same as the first modification example, the second bearing 150 can approach closer to the post portion 201 of the shaft 20 in the radial direction as compared with a case where the sensor 26 is provided on the disk portion 2021 and faces a portion of the trajectory of the sensor magnet 146 in the axial direction. Therefore, the actuator 100 can be downsized in the radial direction. It is possible to shorten a size in the radial direction of the disk portion 2021, thereby improving the rigidity of the disk portion 2021. Furthermore, the sensor 26 can be attached more easily by providing the sensor support portion 28 to which the sensor 26 is attached is provided on at least one of the tube portion 2022 of the lid portion 202 and the post portion 201.

The sensor support portion 28 further includes a sensor positioning portion 280 for determining the attachment position of the sensor 26 in the axial direction. The sensor positioning portion 280 includes a first sensor positioning portion 281 provided at a lower end of the sensor support portion 28 in the axial direction and a second sensor positioning portion 282 provided at an upper end of the sensor support portion 28 in the axial direction, as shown in FIG. 13. Alternatively, the sensor positioning portion 280 may be configured to include one of the first sensor positioning portion 281 and the second sensor positioning portion 282. According to this configuration, it is possible to easily determine the attachment position of the sensor 26 downward in the axial direction by the first sensor positioning portion 281 and to easily determine the attachment position of the sensor 26 upward in the axial direction by the second sensor positioning portion 282, after attaching the sensor support portion 28. Therefore, the sensor 26 can be attached further easily.

The embodiments of the present disclosure have been described above. Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The present disclosure is useful for an actuator attached to the robot or the like.

The invention claimed is:

1. An actuator comprising:
   a motor including a first rotor rotatable in a circumferential direction about a center axis extending in a vertical direction;
   a second rotor including a sensor magnet and rotatable in the circumferential direction about the center axis; and
   a speed reducer that reduces rotation of the first rotor and transmits a torque to the second rotor; wherein
   the motor includes:
      a stationary portion including a stator facing the first rotor; and
      a first bearing rotatably supporting the first rotor with respect to the stationary portion; wherein
   the stationary portion includes a sensor facing a portion of a trajectory of the sensor magnet rotating in the circumferential direction and detects a rotation position of the sensor magnet;
   the stationary portion further includes a shaft including a post portion extending along the center axis;
   the first bearing is fixed to the post portion and the first rotor;
   the shaft includes a lid portion provided at one end of the post portion in the axial direction;
   the lid portion includes a disk portion radially extending outward from the post portion;
   the sensor is provided on the lid portion;
   the actuator further comprises a second bearing between the second rotor and the disk portion in at least one of the axial direction and a radial direction; and
   the stationary portion rotatably supports the second rotor via the second bearing.

2. The actuator according to claim 1, wherein
   the shaft includes a through-hole penetrating in an axial direction;
   the post portion is a hollow tube that the through-hole penetrates; and
   the stationary portion further includes a substrate provided on a side of the post portion opposite to the sensor in the axial direction and wiring that extends through the through-hole and electrically connects the sensor and the substrate to each other.

3. The actuator according to claim 1, wherein
   the second bearing is a ball bearing;
   an inner ring of the ball bearing is fixed to one of the second rotor and the disk portion; and
   an outer ring of the ball bearing is fixed to the other of the second rotor and the disk portion.

4. The actuator according to claim 1, wherein the second bearing includes a slider between the second rotor and the disk portion in one of the axial direction and the radial direction.

5. The actuator according to claim 1, wherein
a groove is provided between the post portion and the lid portion in the axial direction; and
the groove is recessed in the radial direction and extends in the circumferential direction.

6. The actuator according to claim 1, wherein
the second rotor includes a rotor support portion; and
the rotor support portion supports the sensor magnet and positions the second bearing in the axial direction.

7. The actuator according to claim 1, wherein
the second rotor includes a rotor support portion and a sensor magnet support portion supporting the sensor magnet;
the rotor support portion positions the second bearing in the axial direction; and
the sensor magnet support portion is different from the rotor support portion.

8. The actuator according to claim 1, wherein
the speed reducer includes a third bearing;
the third bearing is held by the first rotor radially outward of the first bearing and rotatably supports the second rotor; and
the second bearing is disposed radially outward of the first bearing and overlaps with at least a partial region of the third bearing in the radial direction.

9. The actuator according to claim 1, wherein
the speed reducer includes a third bearing;
the third bearing is held by the first rotor radially outward of the first bearing and rotatably supports the second rotor; and
the second bearing is disposed between the first bearing and the third bearing in the radial direction.

10. The actuator according to claim 1, wherein
the speed reducer includes a third bearing;
the third bearing is held by the first rotor radially outward of the first bearing and rotatably supports the second rotor; and
the second bearing overlaps with at least a partial region of the first bearing in the radial direction and is disposed radially inward of the third bearing, when viewed from the axial direction.

11. The actuator according to claim 1, wherein
the sensor is provided on the disk portion and faces a portion of the trajectory of the sensor magnet in the axial direction;
the sensor magnet rotating in the circumferential direction; and
the second bearing is provided radially outward of the sensor.

12. The actuator according to claim 1, wherein
the sensor is provided on the disk portion and faces a portion of the trajectory of the sensor magnet in the axial direction;
the sensor magnet rotates in the circumferential direction; and
the second bearing is provided radially inward of the sensor.

13. The actuator according to claim 1, wherein
the lid portion further includes a tube portion, which extends in the axial direction from the disk portion toward the post portion and is coupled with one end of the post portion in the axial direction;
the sensor is provided on an outer surface in the radial direction of at least one of the tube portion and the post portion, and faces a portion of the trajectory of the sensor magnet in the radial direction; and
the sensor magnet rotating in the circumferential direction.

14. The actuator according to claim 13, wherein at least one of the lid portion and the post portion further includes a sensor positioning portion that determines an attachment position of the sensor in the axial direction.

15. The actuator according to claim 13, wherein the second rotor includes a sensor magnet positioning portion that determines an attachment position of the sensor magnet in the axial direction.

16. The actuator according to claim 1, wherein
the lid portion further includes a tube portion that extends in the axial direction from the disk portion toward the post portion and is coupled with one end of the post portion in the axial direction;
the stationary portion includes a sensor support portion provided on at least one of the tube portion and the post portion;
the sensor is provided on an outer surface in the radial direction of the sensor support portion and faces a portion of the trajectory of the sensor magnet in the radial direction; and
the sensor magnet rotates in the circumferential direction.

17. The actuator according to claim 16, wherein the sensor support portion includes a sensor positioning portion that determines an attachment position of the sensor in the axial direction.

* * * * *